United States Patent [19]

Horikawa

[11] Patent Number: 4,985,629
[45] Date of Patent: Jan. 15, 1991

[54] SHADING ELMINATION METHOD FOR AN IMAGE READ-OUT APPARATUS

[75] Inventor: Kazuo Horikawa, Kanagawa, Japan

[73] Assignee: Fuji Photo Film Co., Ltd., Kanagawa, Japan

[21] Appl. No.: 391,830

[22] Filed: Aug. 10, 1989

[30] Foreign Application Priority Data

Aug. 24, 1988 [JP] Japan .................. 63-210067

[51] Int. Cl.$^5$ ............................. G01N 23/04
[52] U.S. Cl. .................. 250/327.2; 358/163
[58] Field of Search ............. 250/327.2 F, 327.2 G, 250/236; 358/163, 494, 496

[56] References Cited

U.S. PATENT DOCUMENTS

| 3,800,078 | 3/1974 | Cochran et al. | 358/163 |
| 3,800,079 | 3/1974 | McNeil et al. | 358/163 |
| 4,642,462 | 2/1987 | Aagano et al. | 250/327.2 F |
| 4,734,783 | 3/1988 | Horikawa | 358/163 |
| 4,860,116 | 8/1989 | Nakajima | 358/447 |
| 4,885,467 | 12/1989 | Horikawa | 250/327.2 G |

FOREIGN PATENT DOCUMENTS 138024 4/1985 European Pat. Off. .
61-189763 8/1986 Japan .
WO82/00393 2/1982 PCT Int'l Appl. .

Primary Examiner—Carolyn E. Fields
Attorney, Agent, or Firm—Sughrue, Mion, Zinn, Macpeak & Seas

[57] ABSTRACT

Shading is eliminated in an image read-out apparatus wherein a light beam is deflected by a rotating polygon mirror which has a plurality of reflecting surfaces, a surface which has an image recorded thereon is two-dimensionally scanned with the deflected light beam, and light which is emitted by the scanned surface and which carries information about the image is detected and converted into an image signal by a photoelectric read-out device. The shading elimination method comprises the steps of storing the characteristics of the shading with respect to the respective reflecting surfaces, the shading being caused by nonuniformity in the intensity of the light beam, nonuniformity in the speed at which the surface is scanned with the light beam, nonuniformity in how the photoelectric read-out device, detects light which is emitted by said surface, or the like. Fluctuations in the image signal, which are caused by the shading, are eliminated with respect to the respective reflecting surfaces on the basis of the shading characteristics which correspond to the respective reflecting surfaces.

5 Claims, 2 Drawing Sheets

SHADING ELIMINATION METHOD FOR AN IMAGE READ-OUT APPARATUS

BACKGROUND OF THE INVENTION

1. Field of the Invention

This invention relates to a method of compensating for fluctuations in an image signal which are caused by nonuniformity in the intensity of a scanning light beam, nonuniformity in the speed at which a surface is scanned with the scanning light beam, nonuniformity in the sensitivity with which a photoelectric read-out means detects light emitted by a surface, or the like in an image read-out apparatus. In the image read-out apparatus the surface to be scanned, on which an image has been recorded, is scanned with a light beam in order to cause light carrying information about the image to be emitted from the surface, and the light is photoelectrically detected and converted into an image signal.

2. Description of the Prior Art

Image read-out apparatuses, wherein a surface on which an image has been recorded is scanned with a light beam, and light reflected by the scanned surface, light which has passed through the scanned surface, or light emitted by the scanned surface is detected in order to allow the image to be read out, have heretofore been used as, for example, image input means for computers and image read-out means for facsimiles. In such image read-out apparatuses, a light beam produced by a laser beam source or the like is deflected by a light deflector, which makes the light beam scan a surface, and light which is emitted by the scanned surface is detected and converted into an image signal by a photoelectric read-out means. By way of example, the photoelectric read-out means is constituted of a comparatively small photomultiplier and a light guide member, one edge face of which is positioned along a main scanning line on a surface to be scanned and the other edge face of which is positioned such that it is in close contact with a light receiving face of the photomultiplier. Alternatively, the photoelectric read-out means is constituted of a long photomultiplier which is positioned along a main scanning line of the surface to be scanned, as disclosed in, for example, Japanese unexamined patent publication No. 62(1987)-16666, or a line sensor which is positioned along a main scanning line.

However, with the image read-out apparatuses described above, an image signal generated by the photoelectric read-out means fluctuates due to nonuniformity in the intensity of the scanning light beam, which nonuniformity is caused by nonuniformity in the reflectivity of a reflecting surface of the light deflector. The image signal also fluctuates due to nonuniformity in the speed at which the light beam scans a surface, which nonuniformity is caused by fluctuations in the speed at which the light deflector deflects the light beam. Moreover, the image signal fluctuates due to nonuniformity in how the photoelectric read-out means detects the light emitted from (or reflected by, etc.) the surface, which nonuniformity is caused by nonuniformity in how the light is guided by the light guide member along the main scanning direction, or by nonuniformity in the sensitivity of the long photomultiplier along the main scanning direction. In cases where the aforesaid nonuniformities cause the efficiency with which the light is detected to worsen (i.e. cause shading to occur) it becomes impossible accurately to detect the image which was recorded on the surface to be scanned.

In order to eliminate the aforesaid problems, as disclosed in, for example, Japanese unexamined patent publication Nos. 621(1987)-47259 and 62(1987)-47261, the applicant has proposed apparatuses for eliminating the shading wherein the characteristics of the shading are detected in advance, and the image signal, the sensitivity of the photomultiplier or the like is corrected in accordance with the position at which the light beam is scanning in the main scanning direction. Thereby adverse effects from the shading are eliminated.

In the image read-out apparatuses, rotating polygon mirrors which have a plurality of reflecting surfaces may be used as the light deflectors. A rotating polygon mirror is advantageous over a galvanometer mirror in that the speed at which the light beam is deflected can be increased, which allows an image read-out operation to be carried out quickly.

However, the rotating polygon mirror has problems in that the reflectivity fluctuates among the reflecting surfaces and the inclination with respect to the rotation axis of the rotating polygon mirror and the distance therefrom differ among the reflecting surfaces. Also, the speed at which the rotating polygon mirror is rotated fluctuates periodically, so that the speed at which the light beam is deflected differs among the reflecting surfaces of the rotating polygon mirror. As a result, the intensity of light emitted by a surface which is being scanned with the light beam differs from what it should be. These problems cause the shading characteristics to fluctuate, and shading cannot be eliminated accurately with the conventional shading elimination method.

SUMMARY OF THE INVENTION

The primary object of the present invention is to provide a shading elimination method for an image read-out apparatus, which accurately eliminates shading.

Another object of the present invention is to provide a shading elimination method which enables accurate detection of an image with an image read-out apparatus utilizing a rotating polygon mirror as a light deflector.

The present invention provides a shading elimination method for an image read-out apparatus wherein a light beam is reflected and deflected by a rotating polygon mirror which has a plurality of reflecting surfaces, a surface which has an image recorded thereon is two-dimensionally scanned with the deflected light beam, and light which is emitted by the scanned surface and which carries information about the image is detected and converted into an image signal by a photoelectric read-out means, the shading elimination method comprising the steps of:

(i) storing the characteristics of the shading with respect to the respective reflecting surfaces of said rotating polygon mirror in a storage means, the shading being caused by nonuniformity in the intensity of said light beam, nonuniformity in the speed at which said surface is scanned with said light beam, nonuniformity in how said photoelectric read-out means detects light which is emitted by said surface, or the like, and (ii) eliminating fluctuations in said image signal, which are caused by the shading, with respect to the respective reflecting surfaces of said rotating polygon mirror on the basis of the shading characteristics which correspond to the respective reflecting surfaces.

In cases where the shading characteristics are stored with respect to the respective reflecting surfaces of the rotating polygon mirror in the storage means, the stored shading characteristics reflect fluctuations in reflectivity among the reflecting surfaces, and differences among the reflecting surfaces in the inclination with respect to the rotation axis of the rotating polygon mirror and the distance therefrom. The stored shading characteristics also reflect differences among the reflecting surfaces in the speed at which a light beam is deflected. Therefore, in cases where shading is eliminated with respect to the respective reflecting surfaces on the basis of the stored shading characteristics, the shading can be eliminated accurately. Accordingly, with the shading elimination method for an image read-out apparatus in accordance with the present invention, an image which was recorded on a surface can be read out accurately. Any of the known processes may be employed in order to carry out the shading elimination method in accordance with the present invention insofar as the image signal can be corrected accurately therewith.

DESCRIPTION OF THE PREFERRED EMBODIMENTS

The present invention will hereinbelow be described in further detail with reference to the accompanying drawings.

Figure 1:
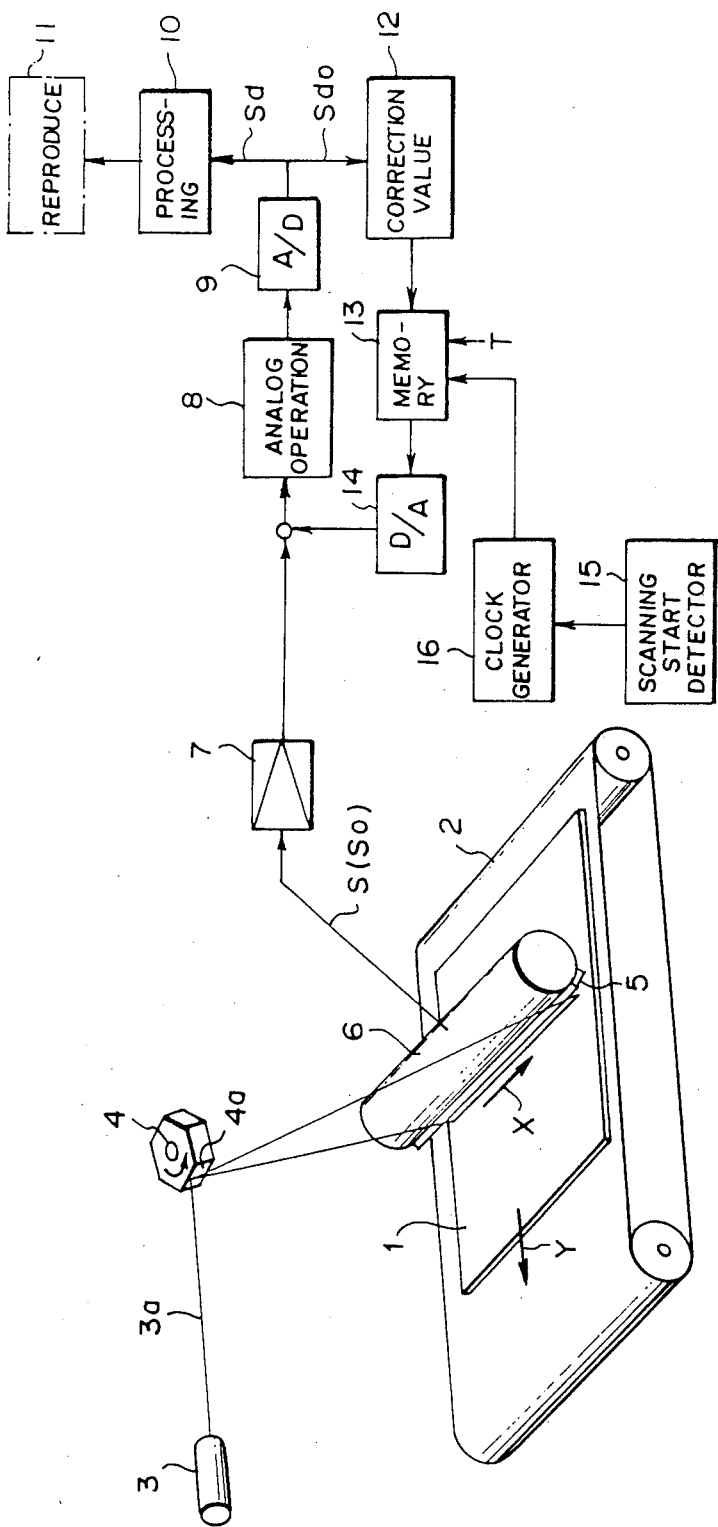
FIG. 1 is a schematic view showing an example of an image read-out apparatus wherein an embodiment of the shading elimination method in accordance with the present invention is employed.

With reference to FIG. 1, an image read-out apparatus takes on the form of, by way of example, a radiation image read-out apparatus for reading out (detecting) light emitted by a stimulable phosphor sheet, on which a radiation image has been stored, the amount of energy stored on the sheet being proportional to energy level of the radiation to which the sheet was exposed. The radiation image read-out apparatus is used in a radiation image recording and reproducing system, wherein a stimulable phosphor sheet is utilized, as disclosed in, for example, U.S. Pat. No. 4,258,264 and Japanese unexamined patent publication No. 56(1981)-11395. A stimulable phosphor sheet 1 on which a radiation image has been stored is conveyed by a sheet conveyance means 2, which is constituted of an endless belt or the like, in the sub-scanning direction indicated by the arrow Y. Also, a laser beam 3a produced by a laser beam source 3 serves as stimulating rays and is deflected by reflecting surfaces 4a, 4a, . . . of a rotating polygon mirror 4, which acts as a light deflector and causes laser beam 3a to scan the stimulable phosphor sheet 1 in the main scanning direction indicated by the arrow X. The main scanning direction is approximately normal to the sub-scanning direction indicated by the arrow Y. As the stimulable phosphor sheet 1 is exposed to the laser beam 3a, the exposed portion emits light in an amount proportional to the amount of energy stored thereon during exposure to radiation. The emitted light is guided by a light guide member 5 and photoelectrically detected by a long photomultiplier 6 which is positioned along the main scanning line.

An analog output signal S is generated by the long photomultiplier 6, and is amplified by a logarithmic amplifier 7. The amplified analog output signal S is fed into an analog operation means 8, and is then converted into a digital read-out image signal Sd by an A/D converter 9. The digital read-out image signal Sd thus obtained is sent to an image processing circuit 10 which carries out processing thereon, such as gradation processing and frequency response processing. The processed image signal is fed into an image reproducing apparatus 11 which may be constituted of a cathode ray tube (CRT), an optical scanning recording apparatus, or the like. The read-out image signal Sd represents the amount of light emitted by the stimulable phosphor sheet 1. Therefore, from the read-out image signal Sd, the radiation image which was stored on the stimulable phosphor sheet 1 can be reproduced as a visible image by the image reproducing apparatus 11. Instead of being immediately fed into the image reproducing apparatus 11, the read-out image signal Sd may be temporarily recorded on a recording medium such as a magnetic disk or a magnetic tape.

In the image read-out apparatus described above, shading is often caused by nonuniformity in the intensity of the laser beam 3a, nonuniformity in the speed at which the stimulable phosphor sheet 1 is scanned with the laser beam 3a, nonuniformity in the sensitivity of the long photomultiplier 6 along the main scanning direction, or the like. When shading arises, the level of the analog output signal S generated by the long photomultiplier 6 varies for different portions of the stimulable phosphor sheet 1, even when the same amount of energy is stored on said portions during their exposure to radiation. Therefore, in such cases, the image which was stored on the stimulable phosphor sheet 1 cannot be read out accurately. Also, in cases where a rotating polygon mirror 4 is utilized as the light deflector, the reflectivity fluctuates among the reflecting surfaces 4a, 4a, . . . , and the angle with respect to the rotation axis of the rotating polygon mirror 4 (i.e. the surface inclination) and the distance from the rotation axis differ among the reflecting surfaces 4a, 4a, . . . Furthermore, the speed at which the rotating polygon mirror 4 is rotated fluctuates periodically, so that the 20 speed at which the laser beam 3a is deflected differs among the reflecting surfaces 4a, 4a, . . . Therefore, in such cases, the shading characteristics fluctuate with respect to the reflecting surfaces 4a, 4a, . . . which deflect the laser beam 3a. How the shading is eliminated will be described hereinbelow.

Before the radiation image read-out operation is carried out as described above, a stimulable phosphor sheet which is of the same type and has the same size as the stimulable phosphor sheet 1 is prepared, and the stimulable phosphor sheet is uniformly exposed to a predetermined dose of radiation such as X-rays. The stimulable phosphor sheet is then subjected to the radiation image read-out operation in the same manner as that described above for the image read-out apparatus shown in FIG. 1. When exposed to the laser beam 3a, the stimulable phosphor sheet emits light approximately uniformly. The emitted light is guided through the light guide member 5 and detected and converted into a reference output signal So by the long photomultiplier 6. The reference output signal So is amplified by the logarithmic amplifier 7. The amplified reference output signal So is fed into the analog operation means 8, and is then converted into a digital reference output signal Sdo by the A/D converter 9 in the same manner as that described above. The digital reference output signal Sdo is fed into a correction value calculating circuit 12. The correction value calculating circuit 12 finds fluctuations in the digital reference output signal Sdo which represents the image information stored at respective picture elements arrayed along the main scanning line which is formed each time the laser beam 3a is deflected by a reflecting surface 4a. (The fluctuations are caused by shading, and represent the shading characteristics.)

Figure 2:
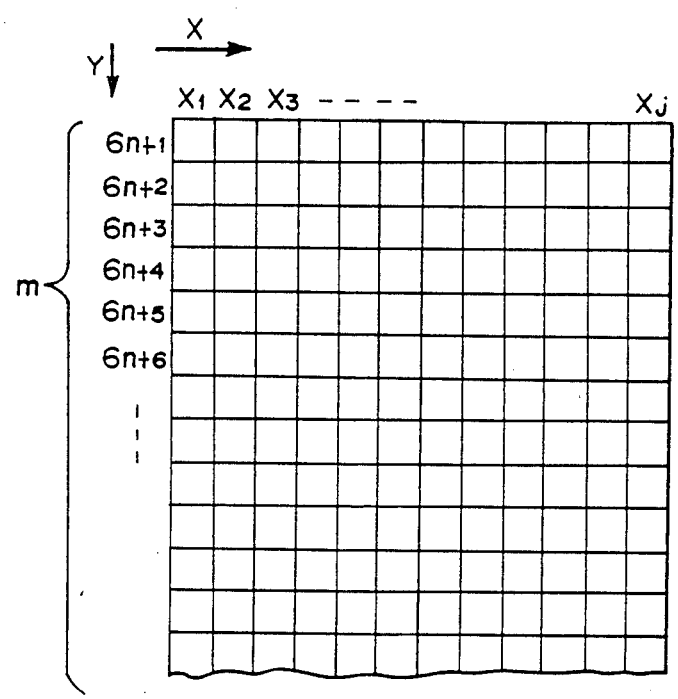
FIG. 2 is an explanatory view showing how the shading is eliminated by the embodiment shown in FIG. 1.

Specifically, as shown in FIG. 2, j number of picture element columns, X1, X2, X3, ..., Xj, are arrayed along the main scanning direction X on the stimulable phosphor sheet. Also, the rotating polygon mirror 4 has six reflecting surfaces 4a, 4a, ... Therefore, m number of picture element rows arrayed along the sub-scanning direction Y are classified in accordance with which reflecting surfaces 4a, 4a, ... deflected the laser beam 3a for that row. The rows are divided into six groups: $6n+1$, $6n+2$, $6n+3$, $6n+4$, $6n+5$ and $6n+6$ wherein n denotes 0 and the positive integers. By way of example, for each of the columns X1, X2, X3, ..., Xj the correction value calculating circuit 12 calculates the mean value of the components of the digital reference output signal Sdo corresponding to the picture elements which belong to the first group $6n+1$. The mean values calculated in this manner for the first group of rows, $6n+1$, are employed as representative signal values R1, R2, R3, ..., Rj. Thereafter, the correction value calculating circuit 12 calculates the mean value Ro of the representative signal values R1, R2, R3, ..., Rj. The correction value calculating circuit 12 also calculates the differences U1, U2, U3, ..., Uj between the mean value Ro and the respective representative signal values R1, R2, R3, ..., Rj. The differences U1, U2, U3, ..., Uj are stored as correction values in a memory 13.

Thereafter, for each of the groups $6n+2$, $6n+3$, $6n+4$, $6n+5$ and $6n+6$, correction values U1, U2, U3, ..., Uj are calculated for each of the columns X1, X2, X3, ..., Xj and stored in the memory 13 in the same manner as that described above. Therefore, six groups of correction values U1, U2, U3, ..., Uj, which correspond to the six main scanning lines effected by the action of the six reflecting surfaces 4a, 4a, ... of the rotating polygon mirror 4, are ultimately stored in the memory 13.

When the radiation image stored on the stimulable phosphor sheet 1 is read out in the same manner as that described above, the six groups of correction values U1, U2, U3, ..., Uj are sequentially read from the memory 13, and used to correct the image signal detected from the stimulable phosphor sheet 1. Specifically, a scanning start detector 15 is provided in the optical path of the laser beam 3a. At the position at which the scanning start detector 15 is located, the laser beam 3a starts to scan in the main scanning direction. For simplicity of explanation, in FIG. 1, the scanning start detector 15 is illustrated by means of a block diagram. Once the image read-out operation has begun, the scanning start detector 15 feeds a signal to a clock pulse generator 16 each time it detects the laser beam 3a. Upon receiving the signal from the scanning start detector 15, the clock pulse generator 16 feeds a pulse signal to the memory 13. The reflecting surface 4a which is to deflect the laser beam 3a at the start of the scanning is selected in advance. Upon receiving the pulse signal, the memory 13 outputs the correct group of correction values U1, U2, U3, ..., Uj which corresponds to the reflecting surface 4a currently deflecting the laser beam 3a. In this manner, the six groups of the correction values U1, U2, U3, ..., Uj are sequentially output in accordance with the reflecting surfaces 4a, 4a, ... to which they correspond. Also, a synchronizing signal T, which is synchronized to the scanning of the laser beam 3a in the main scanning direction, is fed into the memory 13, so that the correction values Un corresponding to the picture elements of an n'th row extending in the main scanning direction are output when the image information stored at said picture elements is read out. The six groups of the correction values U1, U2, U3, ..., Uj are converted into an analog signal by a D/A converter 14, and the analog signal is fed as a correction signal into the analog operation means 8 together with the image signal which was photoelectrically detected from the stimulable phosphor sheet 1. Though the image signal is adversely affected by shading, it is corrected on the basis of the correction signal. Therefore, fluctuations in the image signal caused by shading can be eliminated, and the image which was stored on the stimulable phosphor sheet 1 can be read out accurately. Each time a new reflecting surface 4a deflects the laser beam 3a, the correction values U1, U2, U3, ..., Uj which correspond to said reflecting surface 4a are output from the memory 13.

In the embodiment described above, the light emitted by the stimulable phosphor sheet which was uniformly exposed to radiation is utilized as reference light and is detected by the long photomultiplier 6. From the output of the long photomultiplier the correction values U1, U2, U3, ..., Uj are calculated. However, other kinds of light may be utilized for this purpose. For example, a stimulable phosphor sheet which can store energy from visible light and which has the same size as the stimulable phosphor sheet 1 may be uniformly exposed to visible light. Thereafter, the stimulable phosphor sheet is exposed to the laser beam 3a, and light which is emitted by the stimulable phosphor sheet, the amount of which light is proportional to the amount of energy stored thereon during exposure to the visible light, is utilized as the reference light. In such cases, an erasing light source is generally provided in the image read-out apparatus in order to allow energy remaining on the stimulable phosphor sheet, which has been subjected to an image read-out operation to be erased. The erasing light source produces visible light which serves as erasing light, and it can also be utilized in the calculation of the correction values U1, U2, U3, ..., Uj.

A reference light need not necessarily be used to determine the correction values U1, U2, U3, ..., Uj, which should be stored in the memory 13. Specifically, in cases where the nonuniformity characteristics of the respective reflecting surfaces 4a, 4a, ... of the rotating polygon mirror 4, sensitivity nonuniformity characteristics of the long photomultiplier 6, and the like are known, the correction values U1, U2, U3, ..., Uj can be determined on the basis of such characteristics. However, the correction value calculating circuit 12 should preferably be provided as in the embodiment described above. This is because the correction values U1, U2, U3, ..., Uj can be calculated when necessary after the image read-out apparatus has begun to operate, and therefore it is possible to cope with changes in the shading characteristics which occur with the passage of time.

How the correction values U1, U2, U3, ..., Uj are used to eliminate the shading is not limited provided that the image signal ultimately obtained from the image read-out apparatus is free of the adverse effects of the shading. For example, instead of the image signal being directly changed as in the aforesaid embodiment, the sensitivity of the long photomultiplier 6 or the energy of the laser beam 3a may be changed in accordance with the shading characteristics. Also, instead being constituted of the long photomultiplier 6, the photoelectric read-out means may be constituted of a combination of a large light guide member with a small photomultiplier as disclosed in, for example, U.S. Pat. No. 4,346,295, or may be constituted of a line sensor.

The shading elimination method for an image read-out apparatus in accordance with the present invention is applicable not only to an apparatus wherein the amount of light emitted by a stimulable phosphor sheet 1 is detected, the amount of which emitted light is proportional to the amount of energy stored on the stimulable phosphor sheet 1 during exposure to radiation, but also to any other image read-out apparatuses wherein light which has been reflected by a scanned surface and which carries information about the image recorded on said surface is detected, or wherein light which has passed through the scanned surface and which carries the information about the image recorded on said surface is detected.

What is claimed is:

1. A shading elimination method for an image read-out apparatus wherein a light beam is reflected and deflected by a rotating polygon mirror which has a plurality of reflecting surfaces, a surface which has an image recorded thereon is two-dimensionally scanned with the deflected light beam, and light which is emitted by the scanned surface and which carries information about the image is detected and converted into an image signal by a photoelectric read-out means, the shading elimination method comprising the steps of:

(i) storing shading characteristics of each of a plurality of picture element columns for each of the respective reflecting surfaces of said rotating polygon mirror in a storage means, and (ii) eliminating fluctuations in said image signal, which are caused by the shading, with respect to the respective reflecting surfaces of said rotating polygon mirror on the basis of the stored shading characteristics which correspond to the respective reflecting surfaces.

2. A method as defined in claim 1 wherein said surface to be scanned is the surface of a first stimulable phosphor sheet on which said image has been stored in the form of a radiation image, and said light which is emitted by the scanned surface and which carries information about the image is light emitted by said first stimulable phosphor sheet when said first stimulable phosphor sheet is scanned with stimulating rays which serve as said light beam the amount of which light is proportional to the amount of energy stored on the first stimulable phosphor sheet during exposure to radiation.

3. A method as defined in claim 2 wherein said shading characteristics are detected by an operation in which a second stimulable phosphor sheet, which is of the same type and has the same size as said first stimulable phosphor sheet, is uniformly exposed to radiation and is then two-dimensionally scanned with stimulating rays which have been deflected by said rotating polygon mirror, and in which the amount of light, which is emitted by the second stimulable phosphor sheet when it is scanned with the stimulating rays and which is proportional to the amount of energy stored thereon during exposure to radiation, is detected and converted into a reference output signal by said photoelectric read-out means, and in which fluctuations in said reference output signal are detected as said shading characteristics.

4. A method as defined in claim 2 wherein said shading characteristics are detected by an operation in which a second stimulable phosphor sheet which is capable of storing energy from visible light and which has the same size as said first stimulable phosphor sheet is uniformly exposed to visible light and is then two-dimensionally scanned with stimulating rays which have been deflected by said rotating polygon mirror, and in which the amount of light, which is emitted by the second stimulable phosphor sheet when it is scanned with the stimulating rays and which is proportional to the amount of energy stored thereon during exposure to the visible light, is detected and converted into a reference output signal by said photoelectric read-out means, and in which fluctuations in said reference output signal are detected as said shading characteristics.

5. A method as defined in claim 1 wherein said photoelectric read-out means comprises an elongate photomultiplier.

* * * * *